Sept. 18, 1962      H. GIESECKE      3,054,326
PROJECTING DEVICE FOR PHOTOLITHOGRAPHY
Filed April 23, 1959      2 Sheets-Sheet 1
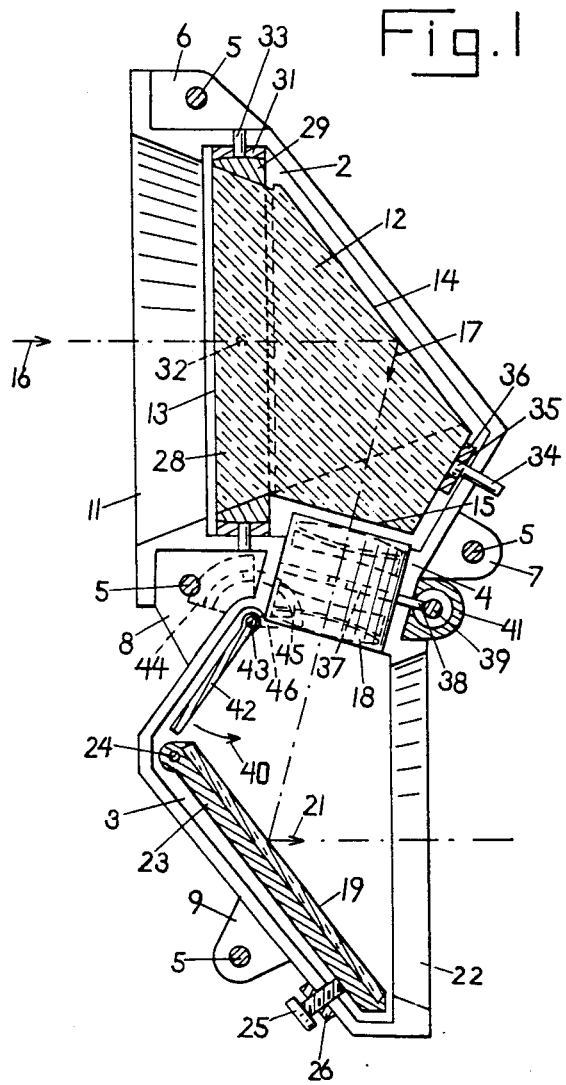
INVENTOR.
Heinrich Giesecke
BY Sept. 18, 1962     H. GIESECKE     3,054,326
PROJECTING DEVICE FOR PHOTOLITHOGRAPHY
Filed April 23, 1959     2 Sheets-Sheet 2
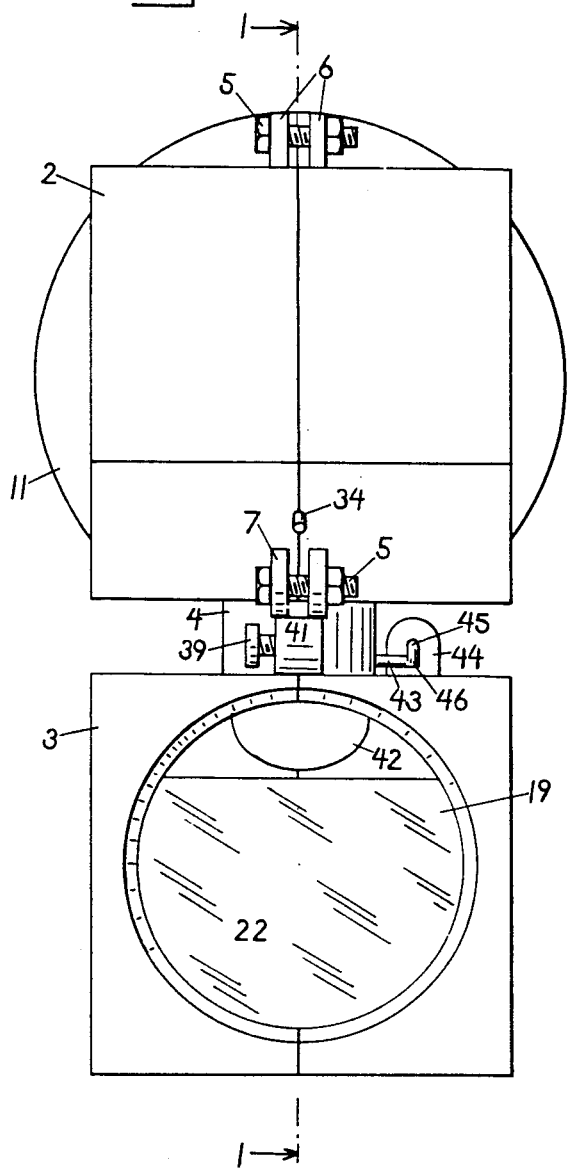
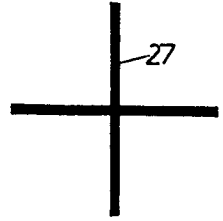
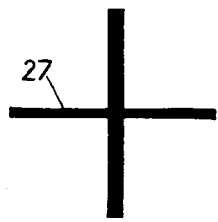
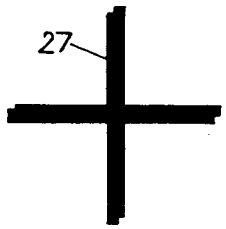
INVENTOR.
Heinrich Giesecke
BY
Deane Steinberg
attorney

United States Patent Office 3,054,326
Patented Sept. 18, 1962

3,054,326
PROJECTING DEVICE FOR PHOTOLITHOGRAPHY
Heinrich Giesecke, Valley Stream, N.Y., assignor to C. P. Goerz, Inwood, N.Y.
Filed Apr. 23, 1959, Ser. No. 808,335
2 Claims. (Cl. 88—57)

This invention relates to photographic cameras used in the lithographic art, and its object is to provide a projecting device which produces a picture with mirror-like reversed sides so that the picture is immediately fit for lithography.

In the prior art, e.g. in U.S. Patent No. 2,408,855 (Huebner), this object has been attained either by incorporating a Dove prism in the objective, or by an attachment to the objective, comprising a plurality of prisms or mirrors. These known structures have certain disadvantages. The Dove prism produces color dispersion defects. Furthermore, this system could not meet the requirement of a reproduction lens angle of 45 degrees or more, which is used in this art and which must be fully illuminated when the reproduced object is enlarged several times by the objective. When an attachment of prisms or mirrors is used, the abovementioned large angle requires the use of very large prisms or mirrors whereby this system becomes heavy and unwieldy, its weight being e.g. fifteen times higher than that of the objective. In addition, it is very difficult to attach the several prisms or mirrors so that each reflecting surface is adjusted with the necessary accuracy, i.e. with an accuracy of at least five angle seconds. This requirement calls for the use of heavy slide tracks, swivel devices, vibration-free mountings and complicated, sometimes electrically operated adjusting means. However, all these means do not eliminate the necessity of frequent readjustment.

Objects of this invention are to avoid these disadvantages and to provide a projecting device which allows a large picture angle, has a relatively light weight, is handy and not bulky, requires little adjustment, stays permanently in adjusted condition, in which all optical errors can be corrected.

Other objects are to facilitate the assembling of this device, and to make the exchange of its objective easy.

In the art of lithographic reproduction, it is desirable to modify the thickness of the pictures of grid lines by shifting the picture a little during the exposure so that overlapping lines result. This is especially necessary for colored lithography in order to produce agreement between the pictures taken through the different color filters. In the prior art, attachments have been used which produce the desired overlapping by tumbling movement, but have similar disadvantages as the abovementioned other attachments.

Further objects are to avoid the use of such attachment, to create little shifts of the picture by tumbling movement of a roof prism which is an element of the projecting system, and to tumble this prism by simple and inexpensive means.

A still further object is to provide simple and easily operable means for closing the device so that passing of light through the same is interrupted.

Still other objects and advantages will appear from the following description of an exemplifying embodiment of this invention, from the appended claims and from the accompanying drawing in which:

FIG. 1 shows a partially sectional side view of an illustrative embodiment of this invention, one separable half of the housing being omitted, the sectionally represented parts being cut along the line 1—1 in FIG. 2.

FIG. 2 shows a rear view of the same embodiment.

FIGS. 3 to 5 are diagrammatic pictures for the explanation of the overlapping effect produced by tumbling motion of the roof prism.

The embodiment illustrated in the drawings has a housing comprising an upper chamber 2, a lower chamber 3 and a tubular part 4 connecting the chambers 2 and 3. This housing is divided into two separable halves along a vertical plane of symmetry. These halves are connected, for example, by screws 5 passing through pairs of lugs 6 to 9 forming extensions of the housing.

The upper chamber 2 has a circular front extension 11 forming a conically flaring opening. A roof prism 12 is situated behind this opening in the chamber 2, has a plane inlet surface 13 pointing toward this opening, a roof surface 14 positioned behind the surface 13 in so inclined position that light rays entering through the surface 13 are deflected downward, and has a plane exit surface 15 positioned under the roof surface. The roof edge of the surface 14 forms the central line of symmetry of this surface and is so inclined that an axial ray entering the prism in the direction of the arrow 16 is deflected into the downward direction of the arrow 17 which is perpendicular to the exit surface 15. The roofprism reflects the light so that the right side of the picture is reversed to the left side and vice versa.

The directional terms "vertical," "downward" and the like used in this specification and in the appended claims are to be understood relatively to the position of the device shown in the drawings, and not absolutely with respect to the directions of space as it is obviously possible to use the device in another position in which, for example a "vertical" part is horizontal in space, or the "downward" direction is lateral in space.

An optical objective 18 is so positioned under the surface 15 that its optical axis is in the direction of the arrow 17. This objective is clamped in the tubular housing part 4 when the two halves of the housing are connected. By temporary disconnection of these halves, the objective can be easily exchanged so that objectives of different focal distance may be used optionally. The objective 18 may have any known and suitable design and/or structure. Preferably, it comprises four symmetrically arranged lenses. For example, an objective of the Artar type may be used.

A mirror 19 is positioned in the housing chamber 3 under the objective 18 and is so inclined that light rays emerging from the objective are reflected toward the rear and that the axial ray passing through the objective in the direction of the arrow 17 is deflected into the horizontal rearward direction of the arrow 21. The chamber 3 has a conically flaring rear opening 22 in the direction of the rays deflected by the mirror 19.

This mirror is affixed to a backing 23 which is turnable about an axle 24 whereby the inclination of the mirror can be adjusted. For fine adjustment, a screw 25 is threaded through the wall of the housing. This screw may be secured in adjusted position by a counter-nut 26.

The use of the left and right side reversing roof prism and the described arrangement of the roof prism, objective and mirror has the advantage that all elements of the device can be made in moderate dimensions so that the device is not excessively heavy or bulky. I have found that the best ratio between optical efficiency and total weight of the device is obtained when the roof edge 14 is so inclined that the angle between the arrows 16 and 17 is smaller than 90 degrees e.g. from 60 to 80 degrees. For example, this angle is 75 degrees in the embodiment shown in the drawing. The total weight of the device of this invention is only about one-third of that of devices known from the prior art for similar purposes. The angle between the arrows 17 and 21 or the deflection by the mirror 19 is preferably exactly the same as the angle between the arrows 16 and 17 whereby the axial ray passes through the rear opening 22 parallel to the direction in which it entered through the front opening 11.

In order to prodce the overlapping lines mentioned as an object of this invention, the picture of a test reticle 27 (FIG. 3) must move during the exposure on the exposed surface. Overlaping lines result if the movement or shift is smaller than the thickness of the lines of the reticle. Horizontal shift results in a thickening of the vertical line as shown in FIG. 4. If, in addition, the picture is shifted vertically, the horizontal lines are also thickened as shown in FIG. 5. Of course both shifts must be smaller than the line thickness to produce overlapping.

According to this invention, very small shifts in all directions are produced by a tumbling motion of the roof prism. This prism has a circular front extension 28 affixed in a ring 29. The ring 29 has a globular outer surface surrounded by another ring 31. Both rings are movably connected by two coaxial horizontal axles 32. The outer ring 31 is movably connected with the housing by two coaxial vertical axles 33. The four axles 32 and 33 have axes meeting in one point. This arrangement forms a Cardanic suspension which allows movement of the prism about the latter point in any direction.

A shaft 34 has an axis pointing to the meeting point of the axes of the axles 32 and 33, passes rotatably through the wall of the housing and has a cam 35 at its inner end. The cam 35 is positioned in a recess of a plate 36 affixed to the roof prism 12. The shaft 34 can be rotated by any suitable and known means, not shown. Thereby, the cam 35 rotates eccentrically and causes the roof prism to tumble in its Cardanic suspension.

The objective 18 may contain an iris diaphragm 37 which is adjustable in known manner by movement of a pin 38. This pin projects outward through slots of the lens mount and of the housing well, which slots are long enough to allow adjusting movement of the pin 38. Preferably, this pin is moved in known manner by a micrometer screw 39 positioned in a box 41 which may be affixed to one of the halves of the housing.

The flow of light through the device can be interrupted by a shutter which is preferably formed by a cover 42 positioned in chamber 3 and turnable about the axis of a shaft 43 in the direction of the arrow 40 to a position in which this cover closes the lower surface of the objective 18. Preferably the shaft 43 is turned by a solenoid 44 which may be arc-shaped and have an arc-shaped movable core 45 connected by an arm 46 to the outer end of the shaft 43 which passes rotatably through the wall of the housing. When the solenoid is activated by current in known manner, the core is drawn farther into the solenoid body whereby the shaft 43 and the cover 42 are turned into closing position.

The described device is so placed, during the operation, between an object to be lithographed and a light sensible lithographic plate that the opening 22 faces the object and the opening 11 faces the plate.

It should be understood that this invention is not confined to the particular embodiment shown and described, the same being merely illustrative, and that the invention may be carried out in other ways within the scope of the appended claims without departing from the spirit of this invention as it is obvious that the embodiment shown and described is only one of the many that may be employed to attain the objects of this invention.

What is claimed is:
1. A projecting device for straightine photolithography, comprising projecting means depicting an object with its vertical lines in vertical position and with its left and right side exchanged whereby the projected picture is immediately fit for photolithography, said means including a roof prism, a mirror, and an objective which covers at least a 45° angle of field and is arranged between said prism and said mirror, handled within a single reflection plane, said device further comprising a housing enclosing said roof prism, objective and mirror and having a vertical front and a vertical rear opening; said roof prism having a vertical inlet surface toward said front opening, having a roof surface positioned behind said inlet surface and an exit surface which is perpendicular to the axis of the objective, said roof surface having a centrally positioned roof edge dividing the roof surface into symmetrical halves inclined toward each other, said roof edge being positioned in the central vertical plane of said prism, forming with said inlet surface an angle of 30–40° whereby a ray passing axially through said inlet surface is deflected downward by an angle of 60°–80° by the roof surface, the right half reflecting toward the left side of said exit surface and vice versa; said objective being positioned under said exit surface co-axially with said deflected rays, said mirror being parallel with the edge of the prism roof surface so that rays having passed said objective are deflected by said mirror toward said rear opening; said housing being formed by two separably connected parts which, in connected condition, contact in the central vertical plane of the housing and form an upper chamber housing said front opening and said roof prism, a lower chamber housing said mirror and said rear opening, and a neck connecting said upper and lower chamber and housing said objective, said neck being so narrow that said objective is clamped between the connected housing parts whereby said objective is easily exchangeable; said roof prism being made of glass having an index of refraction of at least 1.60.

2. Device according to claim 1, comprising cardanic suspension means connecting said roof prism movably with said housing, said cardanic means comprising an inner ring holding said roof prism, a concentric outer ring, an axle movably connecting said rings and extending diagonally to them, and another axle movably connecting said outer ring with said housing and extending in rectangularly crossing direction to said first axle; and means for moving said roof prism tumblingly, said tumbling means comprising a part affixed to said roof prism and having a recess, and a shaft positioned obliquely to said two axles, rotatable in a bore of said housing and having an eccentric cam engaging said recess.

References Cited in the file of this patent

UNITED STATES PATENTS

| | | |
|---|---|---|
| 1,339,235 | Taylor | May 4, 1920 |
| 1,878,967 | Mihalyi | Sept. 20, 1932 |
| 2,050,223 | Gilmore | Aug. 4, 1936 |
| 2,064,368 | Bausch et al. | Dec. 15, 1936 |
| 2,271,296 | Hargrave | Jan. 27, 1942 |
| 2,280,989 | Welch | Apr. 28, 1942 |
| 2,282,656 | Huebner | May 12, 1942 |
| 2,377,476 | Berglund | June 5, 1945 |
| 2,408,855 | Huebner | Oct. 8, 1946 |
| 2,442,564 | Heyer | June 1, 1948 |
| 2,546,111 | Rattray | Mar. 20, 1951 |
| 2,784,645 | Grey | Mar. 12, 1957 |

FOREIGN PATENTS

| | | |
|---|---|---|
| 330,310 | Great Britain | June 12, 1930 |
| 611,220 | Great Britain | Oct. 27, 1948 |
| 669,001 | France | July 27, 1929 |